J. F. PETHTEL.
PEDAL PLATE.
APPLICATION FILED NOV. 21, 1916.
1,242,370. Patented Oct. 9, 1917.
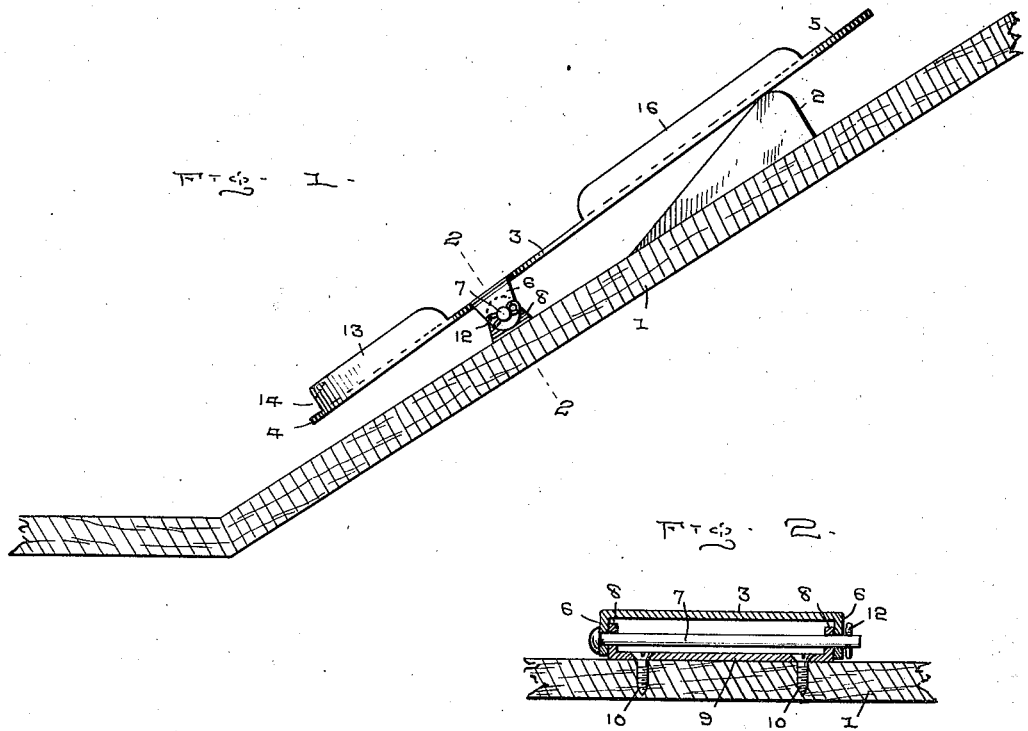
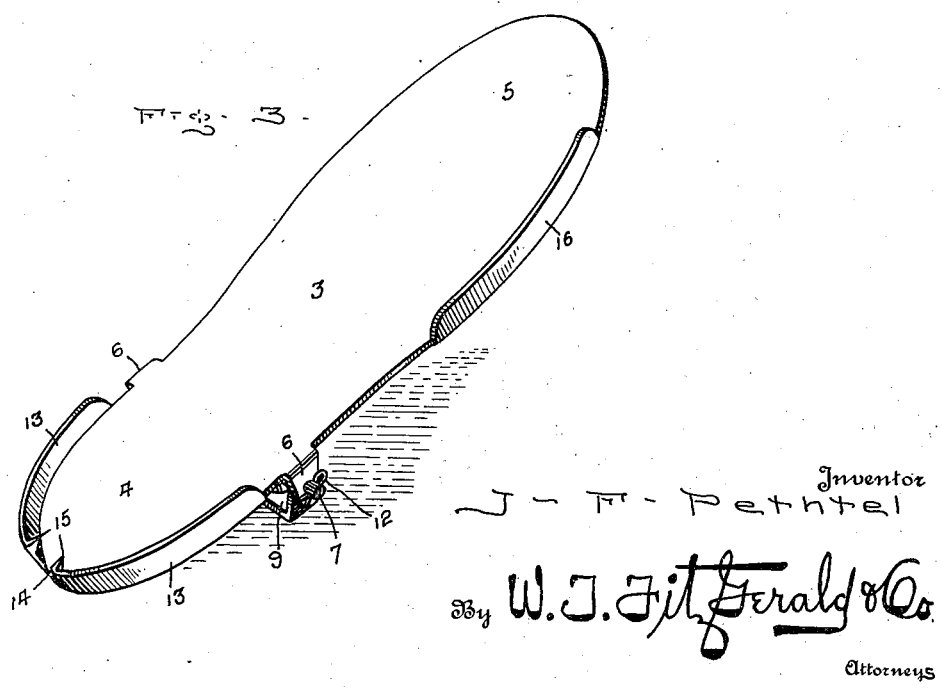
Inventor
J. F. Pethtel
By W. J. Fitzgerald & Co.
Attorneys

UNITED STATES PATENT OFFICE.

JOHN F. PETHTEL, OF BOISE, IDAHO.

PEDAL-PLATE.

1,242,370.  Specification of Letters Patent.  Patented Oct. 9, 1917.

Application filed November 21, 1916. Serial No. 132,599.

*To all whom it may concern:*

Be it known that I, JOHN F. PETHTEL, a citizen of the United States, residing at Boise, in the county of Ada and State of Idaho, have invented certain new and useful Improvements in Pedal-Plates; and I do hereby declare the following to be a full, clear, and exact description of the invention, such as will enable others skilled in the art to which it appertains to make and use the same.

This invention relates to a pedal plate designed to be hingedly mounted upon the floor boards of a motor vehicle and so arranged that the ball or front portion of the pedal plate will be positioned upon the accelerator pedal whereby the latter may be freely and readily actuated.

Another object of the invention is the provision of a pedal plate constructed so as to conform to the shape of the motor vehicle operator's foot, and which is provided with heel flanges and a foot flange arranged at one side of the ball or forward portion of the pedal plate, so that the operator's foot may be positioned and retained upon the pedal plate against any liability of its slipping off of the foot plate.

A further object of the invention is to provide the pedal plate with a pair of heel flanges, the rear end portions of said flanges being spaced apart on opposite sides of the longitudinal center of the pedal plate and formed with inwardly extending teats or points adapted to engage the shoe heel of the motor vehicle operator to firmly retain it in position upon the plate, and said heel flanges being also spaced apart to provide an exit for any dirt that may be deposited upon the pedal plate from the shoe sole or any other source.

With these and other objects in view as will appear as the description proceeds, the invention comprises the various novel features of construction, the combination and arrangement of parts, as will be more fully described hereinafter and set forth with particularity in the appended claims.

Referring to the drawings,

Figure 1 is a sectional elevation showing my improved pedal plate arranged in operative position.

Fig. 2 is a transverse sectional view taken on the line 2—2 of Fig. 1.

Fig. 3 is a detail perspective view of my improved pedal plate.

Similar characters of reference are used to denote like parts throughout the accompanying drawings and the following description.

Referring more particularly to the drawings the reference numeral 1 indicates the floor boards of a motor vehicle through which projects the usual accelerator pedal 2.

In order that the motor vehicle operator may readily locate the accelerator pedal with his foot and when located may easily and comfortably rest his foot in position to actuate the accelerator pedal, I provide a pedal plate 3, which is designed to conform to the shape of the operator's foot and which is shown to embody a rear or heel portion 4 and a forward or ball portion 5. This pedal plate 3 is provided at points adjacent the heel portion and on opposite sides of the plate with downwardly extending ears 6 which are provided with perforations designed to receive a hinge pin 7 that is mounted in apertured ears 8 of a supporting bracket 9, which latter is adapted to be secured to the floor boards 1 by screws or any other suitable fastening means 10. One end of the hinge pin 7 is provided with a head 11 and the other end is provided with an aperture through which is positioned a cotter pin 12 designed to hold the hinge pin in place.

The pedal plate is further provided at the heel portion with a pair of heel flanges 13 that extend upwardly from the plate and extend around the heel portion 4 from points adjacent the ears 6 to points adjacent the longitudinal center of the pedal plate so as to provide an opening 14 between the rear ends of these flanges. Each of the rear ends of these flanges 13 are provided with inwardly extending teats or points 15 that are designed to engage the shoe heel of the motor vehicle operator and are provided to hold the same in position upon the pedal plate. It is also to be understood that by the provision of this opening 14, that any dirt that may be dropped upon the pedal plate from the operator's shoe, or dirt that may accumulate upon the plate from any other source, will be readily discharged through this opening, thus providing means to keep the plate clean and free from dirt at all times.

The forward or ball portion of the pedal plate is provided at one side, and in this instance the right hand side, with an upwardly extending flange 16 which is designed to be engaged by the shoe sole of the operator and serves to effectively and comfortably hold and retain the foot in position upon the pedal plate.

It is of course to be understood that this improved pedal plate is so constructed and so balanced upon its hinged support that the forward or ball portion of the pedal plate will rest very lightly upon the accelerator pedal 2, that is, so lightly that the weight of the pedal plate will in no way affect the speed of the motor of the vehicle.

From the foregoing description it will be apparent that I have provided a pedal plate which can be readily and quickly attached or detached from the motor vehicle floor boards, and one which is so constructed that the foot will not slip or slide off of it and yet is so formed that the foot can be readily moved from the pedal plate to either the clutch or brake pedal as found desirable.

What I claim is:—

1. In a motor vehicle, the combination with the accelerator pedal thereof, of a pedal plate embodying a heel portion and a ball portion, means for hingedly supporting said pedal plate upon the vehicle floor boards so that the ball portion of the pedal plate rests upon said accelerator pedal, and upwardly extending heel flanges carried by the heel portion of said pedal plate, said heel flanges being spaced apart at their rear ends to provide a dirt exit.

2. In a motor vehicle, the combination with an accelerator pedal thereof, of a pedal plate embodying a heel portion and a ball portion, means for hingedly supporting said pedal plate upon the vehicle floor boards so that the ball portion thereof rests upon said accelerator pedal, a sole engaging flange extending upwardly from one side edge of the ball portion of said plate, spaced heel flange extending upwardly from the heel portion of said pedal plate, and teats extending inwardly from the opposed edges of said heel flanges and adapted to engage and hold the operator's heel in position upon the pedal plate against accidental displacement.

In testimony whereof I have signed my name to this specification in the presence of two subscribing witnesses.

JOHN F. PETHTEL.

Witnesses:
  IKE M. MARKS,
  Y. M. MARKS.